US005847053A

United States Patent [19]
Chum et al.

[11] Patent Number: 5,847,053
[45] Date of Patent: Dec. 8, 1998

[54] ETHYLENE POLYMER FILM MADE FROM ETHYLENE POLYMER BLENDS

[75] Inventors: Pak-Wing Steve Chum, Lake Jackson; Ronald P. Markovich, Houston; George W. Knight, Lake Jackson; Shih-Yaw Lai, Sugar Land, all of Tex.

[73] Assignee: The Dow Chemical Company, Midland, Mich.

[21] Appl. No.: 834,050

[22] Filed: Apr. 11, 1997

Related U.S. Application Data

[63] Continuation of Ser. No. 544,497, Oct. 18, 1995, Pat. No. 5,677,383, which is a continuation of Ser. No. 378,998, Jan. 27, 1995, abandoned, which is a continuation of Ser. No. 54,379, Apr. 28, 1993, abandoned, which is a continuation-in-part of Ser. No. 776,130, Oct. 15, 1991, Pat. No. 5,272,236.

[51] Int. Cl.$^6$ ..................................................... C08L 23/08
[52] U.S. Cl. ............................................................ 525/240
[58] Field of Search ............................................ 525/240

[56] References Cited

U.S. PATENT DOCUMENTS

| | | |
|---|---|---|
| 2,983,704 | 5/1961 | Roedel . |
| 3,179,720 | 4/1965 | Hillmer . |
| 3,231,636 | 1/1966 | Synder et al. . |
| 3,340,328 | 9/1967 | Brindell et al. . |
| 3,491,073 | 1/1970 | Marinak . |
| 3,645,992 | 2/1972 | Elston . |
| 3,914,342 | 10/1975 | Mitchell . |
| 3,998,914 | 12/1976 | Lillis et al. . |
| 4,205,021 | 5/1980 | Morita et al. . |
| 4,230,831 | 10/1980 | Sakurai et al. . |
| 4,263,422 | 4/1981 | Lowery, Jr. et al. . |
| 4,320,088 | 3/1982 | Nicco . |
| 4,330,639 | 5/1982 | Matsuura et al. . |
| 4,346,834 | 8/1982 | Mazumdar . |
| 4,374,227 | 2/1983 | Michie, Jr. . |
| 4,405,774 | 9/1983 | Miwa et al. . |
| 4,429,079 | 1/1984 | Shibata et al. . |
| 4,438,238 | 3/1984 | Fukushima et al. . |
| 4,461,873 | 7/1984 | Bailey et al. . |
| 4,469,752 | 9/1984 | Yoshimura et al. . |
| 4,510,303 | 4/1985 | Oda et al. . |
| 4,530,914 | 7/1985 | Ewen et al. . |
| 4,542,199 | 9/1985 | Kaminsky et al. . |
| 4,659,685 | 4/1987 | Coleman, III et al. . |
| 4,668,752 | 5/1987 | Tominari et al. . |
| 4,701,432 | 10/1987 | Welborn, Jr. . |
| 4,752,597 | 6/1988 | Turner . |
| 4,770,912 | 9/1988 | Furrer et al. . |
| 4,786,688 | 11/1988 | Thiersault et al. . |
| 4,789,714 | 12/1988 | Cozewith et al. . |
| 4,801,652 | 1/1989 | Mizutani et al. . |
| 4,804,714 | 2/1989 | Olivo . |
| 4,828,906 | 5/1989 | Nishimura et al. . |
| 4,837,262 | 6/1989 | Jeon et al. . |
| 4,935,474 | 6/1990 | Ewen et al. . |
| 4,937,299 | 6/1990 | Ewen et al. . |
| 4,939,217 | 7/1990 | Stricklen . |

(List continued on next page.)

FOREIGN PATENT DOCUMENTS

| | | |
|---|---|---|
| 2008315 | 7/1990 | Canada . |
| 0 374 695 | 6/1990 | European Pat. Off. . |
| 0 416 815 | 3/1991 | European Pat. Off. . |
| 0416815A2 | 3/1991 | European Pat. Off. . |
| 0 436 328 | 7/1991 | European Pat. Off. . |
| 0 447 035 | 9/1991 | European Pat. Off. . |
| 0 503 791 | 9/1992 | European Pat. Off. . |
| 0 572 034 | 12/1993 | European Pat. Off. . |
| 0 598 626 | 5/1994 | European Pat. Off. . |
| 0 662 989 | 7/1995 | European Pat. Off. . |
| 0 735 090 | 2/1996 | European Pat. Off. . |

(List continued on next page.)

OTHER PUBLICATIONS

*Modern Methods of Polymer Characterization*, pp. 103–112, (1991) "Measurement of Long–Chain Branch Frequency in Synthetic Polymers", by Alfred Rudin.

*The Journal of Chemical Physics*, vol. 17, No. 12, Dec. (1949), pp. 1301–1314, "The Dimensions of Chain Molecules Containing Branches and Rings", by Bruno H. Zimm and Walter H. Stockmayer.

*Antec 93—Be In That Number*, New Orleans, May 9–13, (1993), vol. II, "Dow Constrained Geometry Catalyst Technology (CGCT): New Rules For Ethylene α–Olefin Interpolymers–controlled Rheology Polyolefins", pp. 1188–1192, by S. Lai and G.W. Knight.

*Journal of Rheology*, (1986), pp. 340–341, 344–345, 348–349, 352–353, 356–357, "Wall Slip in Viscous Fluids and Influence of Materials of Construction", by A.V. Ramamurthy.

*Rheometers for Molten Plastics*, (1982), pp. 97–99, by John Dealy.

*Polymer Engineering and Science*, vol. 17, No. 11, Nov. (1977), pp. 769–774, "Correlation of Low Density Polyethylene Rheological Measurements with Optical and Processing Properties", by M. Shida, R.N. Shroff, and L.V. Cancio.

"A Review of High Resolution Liquid $^{13}$Carbon Nuclear Magnetic Resonance Characterizations of Ethylene–Based Polymers", *JMS–Rev. Macromol. Chem. Phys.*, C29(2&3), pp. 201–317, (1989) by James C. Randall.

(List continued on next page.)

Primary Examiner—David W. Wu

[57] ABSTRACT

Fabricated articles made from formulated ethylene polymer compositions are disclosed. Films made from such formulated compositions have surprisingly good impact and tensile properties, and an especially good combination of modulus and toughness. The ethylene polymer compositions have at least one homogeneously branched substantially linear ethylene/α-olefin interpolymer and at least one heterogeneously branched ethylene polymer. The homogeneously branched substantially linear ethylene/α-olefin interpolymer has a density from about 0.89 to about 0.92 g/cm$^3$ and a slope of strain hardening coefficient greater than or equal to about 1.3.

16 Claims, 2 Drawing Sheets

U.S. PATENT DOCUMENTS

| | | |
|---|---|---|
| 4,981,760 | 1/1991 | Naito et al. . |
| 4,987,212 | 1/1991 | Morterol et al. . |
| 5,001,206 | 3/1991 | Bashir et al. . |
| 5,026,798 | 6/1991 | Canich . |
| 5,028,663 | 7/1991 | Chung . |
| 5,032,651 | 7/1991 | McDaniel et al. . |
| 5,041,501 | 8/1991 | Shirodkar . |
| 5,047,468 | 9/1991 | Lee et al. . |
| 5,055,438 | 10/1991 | Canich . |
| 5,077,255 | 12/1991 | Welborn . |
| 5,082,902 | 1/1992 | Gurevitch et al. . |
| 5,084,540 | 1/1992 | Albizzati et al. . |
| 5,091,228 | 2/1992 | Fujii et al. . |
| 5,177,147 | 1/1993 | Spenadel et al. . |
| 5,189,106 | 2/1993 | Morimoto et al. . |
| 5,206,075 | 4/1993 | Hodgson, Jr. . |
| 5,210,142 | 5/1993 | Kale et al. . |
| 5,218,071 | 6/1993 | Tsutsui et al. . |
| 5,266,392 | 11/1993 | Land et al. . |
| 5,272,016 | 12/1993 | Ralph . |
| 5,272,236 | 12/1993 | Lai et al. . |
| 5,278,272 | 1/1994 | Lai et al. . |
| 5,350,807 | 9/1994 | Pettijohn et al. . |
| 5,374,700 | 12/1994 | Tsutsui et al. . |
| 5,376,439 | 12/1994 | Hodgson et al. . |
| 5,395,471 | 3/1995 | Obijeski et al. . |
| 5,395,810 | 3/1995 | Shamshoum et al. . |
| 5,408,004 | 4/1995 | Lai et al. . |
| 5,444,145 | 8/1995 | Brant et al. . |
| 5,464,905 | 11/1995 | Tsutsui et al. . |
| 5,519,091 | 5/1996 | Tsutsui et al. . |
| 5,530,065 | 6/1996 | Farley et al. . |
| 5,656,696 | 8/1997 | Yamamoto et al. . |
| 5,663,236 | 9/1997 | Takahashi et al. . |

FOREIGN PATENT DOCUMENTS

| | | |
|---|---|---|
| 53-75278 | 7/1978 | Japan . |
| 131516 | 6/1984 | Japan . |
| 62-121709 | 6/1987 | Japan . |
| 63-328197 | 10/1990 | Japan . |
| 53-31229 | 12/1993 | Japan . |
| 60-16880 | 1/1994 | Japan . |
| 1233599 | 5/1971 | United Kingdom . |
| WO 87/03610 | 6/1987 | WIPO . |
| 9003414 | 4/1990 | WIPO . |
| WO 90/03414 | 4/1990 | WIPO . |
| WO 93/00400 | 1/1993 | WIPO . |
| WO 93/03093 | 2/1993 | WIPO . |
| WO 93/08221 | 4/1993 | WIPO . |
| WO 93/13143 | 7/1993 | WIPO . |
| WO 94/00500 | 1/1994 | WIPO . |
| WO 94/03538 | 2/1994 | WIPO . |
| WO 94/06857 | 3/1994 | WIPO . |
| WO 94/12568 | 6/1994 | WIPO . |
| WO 94/17112 | 8/1994 | WIPO . |
| WO 95/13321 | 5/1995 | WIPO . |

OTHER PUBLICATIONS

*ACS Symposium Series,* No. 142, pp. 94–118, (1980) "Characterization of Long–Chain Branching in Polyethylenes Using High–Field Carbon–13 NMR", by J.C. Randall.

SPE Regional Technical Conference, Quaker Square Hilton, Akron, Ohio, Oct. 1–2, (1985), pp. 107–119, "The Role of Comonomer Type and Distribution in LLDPE Product Performance", by L.D. Cady.

*Journal of Polymer Science: Polymer Physics Edition,* vol. 20, pp. 441–445 (1982), "Determination of Branching Distributions in Polyethlylene and Ethylene Copolymers", by L. Wild,T.R. Ryle, D.C. Knobeloch, and I.R. Peat.

*Antec 93,* pp. 58–62, "Flexomer Polyolefins, A Unique Class of Ethylene Copolymers for Low Temperature Film Applications", by D.C. Eager, G.E. Ealer, S.A. Bartocci and D.M. Kung.

Worldwide Metallocene Metcon '94, May 25–27, (1994), "Improved Processing and Performance Balance of Polyethylene Resins Using Metallocene Catalyst Technology", by Mark A. Wendorf.

Specialty Plastics Conference 1990—The Raw Materials Scenario for PE and PP Film Applications and Markets, Dec. 3–4, "High Value Added Film Using an Olefin Based Elastomer", by M. Tanaka.

*Packaging Technology and Engineering,* Apr. 1994, pp. 34–37, "Single–Site Catalysts Produce Tailor–Made, Consistent Resins", by David F. Simon.

Polyolefin Modification with EXACT™ Plastomers, SPE, Feb. 21–24, 1993, pp. 539–564, by T.C. Yu and G.J. Wagner.

Research Disclosure 37652, Aug. 1995.

Research Disclosure 36210, Jun. 1994.

Research Disclosure 37644, Aug, 1995.

*Plastics World,* LLDPE Blends Perk Up Performance of PE Films, pp. 40–43, Dec. 1982.

*MetCon '93,* May 26–28, 1993, Houston, Tx, "The Dfistinguished Features of Metallocene–Based Polyolefins", pp. 235–243, 240, by Akira Todo..

*EXACT™ Polymers—For Targeted Performance in Film Packaging,* product brochure published by Exxon Chemical Company Oct. 1992.

*Journal of Polymer Science: Part B: Polymer Physics,* "An Analytical Technique for Measuring Relative Tie–Molecule Concentration in Polyethylene", vol. 29, pp. 1047–1055 (1991) by A. Lustiger and N. Ishikawa.

*Journal of Materials Science,* "Molecular Topology in Ethylene Copolymers Studied by Means of Mechanical Testing", vol. 23, pp. 415–421 (1988) by R. Seguela and F. Rietsch.

*Polymer,* "Tensile Drawing Behaviour in a Linear Low–Density Polyethylene: Changes in Physical and Mechanical Properties", vol. 27, pp. 532–536 (1986) by R. Seguela and F. Rietsch.

*Makromol. Chem., Macromol. Symp.,* "Slow Crack Growth in Polyethylene—A Review", vol. 41, pp. 55–67 (1991) by Norman Brown, Xici Lu, Yan–Ling Huang, and Ruzheng Qian.

*Journal of Polymer Science: Part B: Polymer Physics,* "Fatigue Crack Propagation in High–Density Polyethylene", vol. 29, pp. 371–388 (1991) by J.T. Yen and J. Runt.

*Macromolecules,* "Sequence and Branching Distribution of Ethylene/1–Butene Copolymers Prepared with a Soluble Vanadium–Based Ziegler–Natta Catalyst", vol. 25, pp. 2820–2827 (1992) by N. Kuroda, Y. Nishikitani, K. Matsuura and N. Ikegami.

*Polymer Communications,* "Morphological Location of Ethyl Branches in 13C–Enriched Ethylene/1–Butene Random Copolymers", vol. 29, pp. 258–260, Sep. (1988) by D. C. McFaddin, K.E. Russell and E. C. Kelusky.

*Journal of Polymer Science: Polymer Chemistry Edition,* "The Preparation and Characterization of Homogeneous Copolymers of Ethylene and 1–Alkenes", vol. 22, pp. 1383–1392 (1984) by B.K. Hunter, K.E. Russell, M.V. Scammell and S.L. Thompson.

*Polymer Engineering and Science,* "Characterizing Polyethylene–Based Blends with Temperature Rising Elution Fractionation (TREF) Techniques", vol. 27, No. 20, pp. 1562–1571, Mid–Nov. (1987) by Eric C. Kelusky, Clay T. Elston and Ron R. Murray.

"Exxpol Technology For Targeted Polymer Performance," (brochure from/by Exxon Chemical Company with an unknown date).

*SPO '93,* "Exact Polymers Unique Properties for Value–Added Applications" by F.J. Steininger.

*Journal of Polymer Science,* Part A. vol. 1 (pp. 2869–2880(1963)). "Long–Chain Branching Frequency in Polyethylene " by J. E. Guillet.

*Polymer Preprints, Amer. Chem. Society,* vol. 12, No. 1, pp. 277–281 (Mar. 1971), "Evidence of Long–Chain Branching in High Density Polyethylene" by E. E. Drott and R. A. Mendelson.

*Journal of the American Chemical Society,* 98:7, pp. 1729–1742 (Mar. 31, 1976) "Structure and Chemistry of Bis(cyclopentadienyl)–MLn Complexes" by Joseph W. Lauher and Roald Hoffman.

*Polymer Engineering and Science,* vol. 16, No. 12, pp. 811–816 (Dec. 1976), "Influence of Long–Chain Branching on the Viscoelastic Properties of Low–Density Polyethylenes" by L. Wild, R. Ranganath, and D. Knobeloch.

*Angew. Chem. Int. Ed. Engl.* pp. 630–632 (1976) vol. 15, No. 10, "Halogen–Free Soluble Ziegler Catalysts for the Polymerization of Ethylene. Control of Molecular Weight by Choice of Temperature" by Arne Andresen et al.

*Advances in Organometallic Chemistry,* pp. 99–148, vol. 18, (1980) "Ziegler–Natta Catalysis" by Hansjorg Sinn and Walter Kaminsky.

*Angew. Chem. Int. Ed. Engl.,* pp. 390–393, vol. 19, No. 5 (1980) "'Living Polymers' on Polymerization with Extremely Productive Ziegler Catalysts" by Hansjorg Sinn, Walter Kaminsky, Hans–Jurgen Vollmer, and Rudiger Woldt.

*Polymer Bulletin,* 9, pp. 464–469 (1983) "Halogen Free Soluble Ziegler Catalysts with Methylalumoxan as Catalyst" by Jens Herwig and Walter Kaminsky.

*Makromol. Chem., Rapid Commun.,* 4, pp. 417–421 (1983) "Bis(cyclopentadienyl)zirkon–Verbingungen und Aluminoxan als Ziegler–Katalysatoren fur die Polymerisation und Copolymerisation von Olefinen" by Walter Kaminsky et al.

*ANTEC Proceedings,* pp. 306–309 (1983), "Analysis of Long Chain Branching in High Density Polyethylene" by J.K. Hughes.

*Makromol. Chem., Rapid Commun.,* (5) pp. 225–228 (1984) "Influence of hydrogen on the polymerization of ethylene with the homogeneous Ziegler system bis(cyclopentadienyl)zirconiumdicholoride/aluminoxane" by Walter Kaminsky et al.

*Journal of Polymer Science: Polymer Chemistry Edition,* pp. 2117–2133 (1985) vol. 23, "Homogeneous Ziegler Natta Catalysis. II. Ethylene Polymerization by IVB Transition Metal Complexes/Methyl Aluminoxane Catalyst Systems" by E. Giannetti and R. Mazzocchi.

*Journal of Applied Polymer Science,* pp. 3751–3765 (1985) vol. 30, "On the Effects of Very Low Levels of Long Chain Branching on Rheological Behavior in Polyethylene" by B. H. Bersted.

*Journal of Polymer Science: Polymer Chemistry Edition,* pp. 2151–2164 (1985) vol. 23, "Ethylene Propylene Diene Terpolymers Produced with a Homogeneous and Highly Active Zirconium Cataylst" by Walter Kaminsky et al.

*The Society of Rheology,* pp. 337–357 (1986) vol. 30, "Wall Slip in Viscous in Viscous Fluids and Influence of Materials of Construction" by A. V. Ramamurthy.

*Makromol. Chem., Macromol.Symp.,* 4, pp. 103–118 (1986) "Elastomers by Atactic Linkage of α–Olefins Using Soluble Ziegler Cataysts" by W. Raminsky and M. Schlobohm.

*Journal of Rheology,* 31 (8) pp. 815–834 (1987) "Wall Slip and Extrudate Distortion in Linear Low–Density Polyethylene" by D. Kalika and M. Denn.

*Makromol. Chem.,* 190, pp. 515–526 (1989) "Copolymerization of Cycloalkenes with Ethylene In Presence of Chiral Zirconocene Catalysts" by W. Kaminsky and R. Spiehl.

*Journal of Macromolecular Science: Reviews in Macromolecular Chemistry and Physics,* C29(2&3), pp. 201–303 (1989) "A Review of High Resolution Liquid $^{13}$Carbon Nuclear Magnetic Resonance Characterizations of Ethylene––Based Polymers".

*Journal of Non–Newtonian Fluid Mechanics,* 36, pp. 255–263 (1990) "Additional Observations on The Surface Melt Fracture Behavior Of Linear Low–Density Polyethylene" by R. Moynihan, D. Baird, and R. Ramanathan.

*Makromol. Chem. Rapid Commun.,* pp. 89–94 (1990) "Terpolymers of Ethylene, Propene and 1,5–Hexadiene Synthesized with Zirconocene/Methylaluminoxane" by W. Kaminsky and H. Drogemuller.

*Journal of Rheology,* 35(4), 3(May, 1991) pp. 497–452, "Wall Slip of Molten High Density Polyethylene. I. Sliding Plate Rheometer Studies" by S. G. Hatzikiriakos and J. M. Dealy.

*Proceedings of the 1991 IEEE Power Engineering Society,* pp. 184–190 (Sep. 22–27, 1991), New Specialty Linear Polymers (SLP) For Power Cables by Monica Hendewerk and Lawrence Spenadel.

*Society of Plastic Engineers Proceedings,* Polyolefins VII International Conference, Feb. 24–27, 1991, "Structure/Property Relationships In Exxpol™ Polymers" (pp. 45–66) by C. Speed, B. Trudell, A. Mehta, and Stehling.

*1991 Specialty Polyolefins Conference Proceedings,* "The Marketing Challenge Created By Single Site Catalysts in Polyolefins," Sep. 24, 1991, (pp. 41–45) by Michael P. Jeffries.

*High Polymers,* vol. XX, "Crystalline Olefin Polymers" Part 1, pp. 495–501.

*1991 Polymers, Laminations & Coatings Conference,* TAPPI Proceedings, presented in Feb. 1991, pp. 289–296, "A New Family of Linear Ethylene Polymers with Enhanced Sealing Performance" by D. Van der Sanden and R. W. Halle.

*Society of Plastic Engineers 1991 Specialty Polyolefins Conference Proceedings,* pp. 41–55, "The Marketing Challenge Created by Single Site Catalysts Polyolefins" M. Jeffries (Sep. 24, 19910.

*Advances In Polyolefins,* by R. B. Seymour and T. Cheng, (1987), pp. 373–380 "Crystallinity and Morphology of Ethylene/α–Olefin Copolymers" by P. Shouterden, G. Groeninckx, and H. Reynaers.

*Advances in Polyolefins,* by R.B. Seymour and T. Cheng, (1987) "New Catalysis and Process For Ethylene Polmerization", pp. 337–354, by F. Karol, B. Wagner, I. Levine, G. Goeke, and A. Noshay.

*Advances In Polyolefins,* by R.B. Seymour and T. Cheng, (1987) "Polmerization of Olefins With a Homogeneous Zirconium/Alumoxane Catalyst", pp. 361–371 by W. Kaminsky and H. Hahnsen.

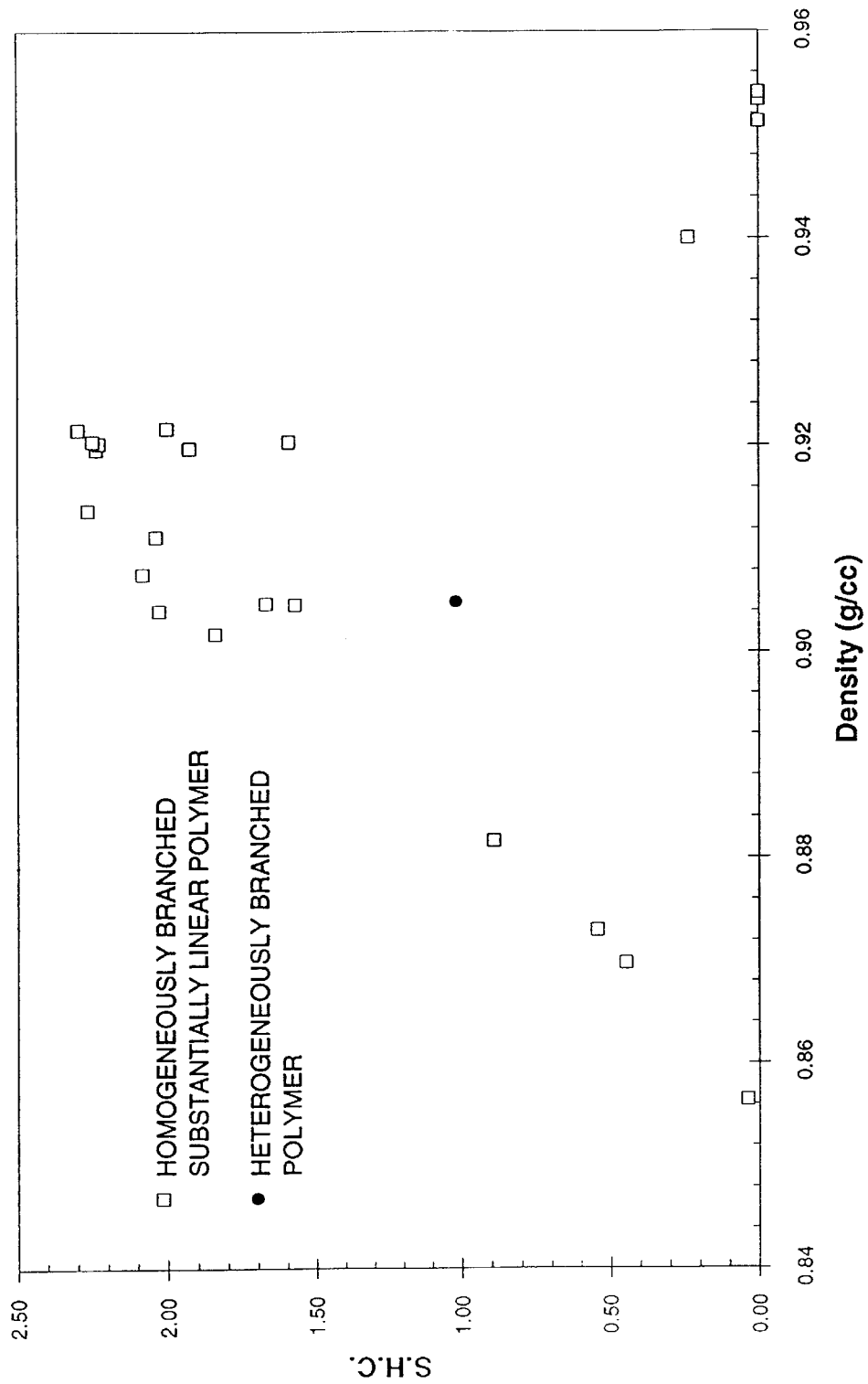

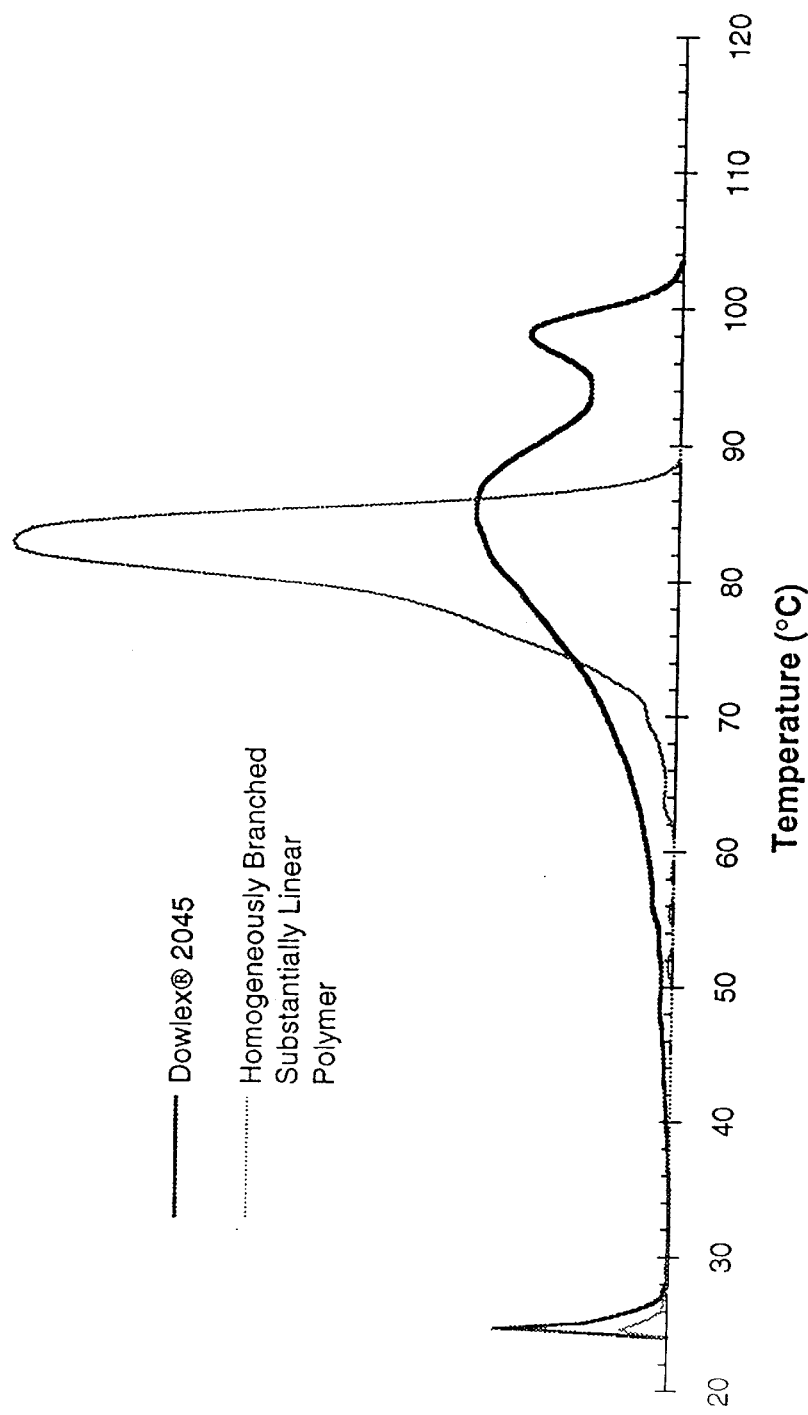

ETHYLENE POLYMER FILM MADE FROM ETHYLENE POLYMER BLENDS

CROSS-REFERENCE TO RELATED APPLICATIONS

This application is a Rule 1.60 continuation application of application Ser. No. 08/544,497, filed Oct. 18, 1995, now issued U.S. Pat. No. 5,677,383, which was a Rule 1.60 continuation application of application Ser. No. 08/378,998, filed Jan. 27, 1995, now abandoned, which was a Rule 1.62 continuation application of application Ser. No. 08/054,379, filed Apr. 28, 1993, now abandoned, which was a continuation-in-part application of Ser. No. 07/776,130, filed Oct. 15, 1991, now issued U.S. Pat. No. 5,272,236, the disclosures of each of which are incorporated herein in their entirety by reference. This application is also related to application Ser. No. 08/475,737, filed Jun. 7, 1995, now abandoned; application Ser. No. 07/939,281, filed Sep. 2, 1992, now issued U.S. Pat. No. 5,278,272; and application Ser. No. 08/510,527, filed Aug. 2, 1995, now abandoned which is a continuation application of application Ser. No. 08/010,958, filed Jan. 29, 1993, now abandoned; the disclosures of each of which are incorporated herein by reference.

FIELD OF THE INVENTION

This invention relates to compositions comprising specific ethylene/α-olefin polymer blends.
The polymer blends preferably comprise:
(A) at least one homogeneously branched substantially linear ethylene/α-olefin interpolymer having specific processing characteristics, blended together with
(B) a heterogeneously branched ethylene polymer.

Such compositions are particularly useful in film applications (e.g., high strength thin gauge packaging film or heat sealable packaging film).

BACKGROUND OF THE INVENTION

Thin film products fabricated from linear low density polyethylene (LLDPE) and/or high density polyethylene (HDPE) are widely used for packaging applications such as merchandise bags, grocery sacks, and industrial liners. For these applications, films with high tensile strength, as well as high impact strength, are desired because film producers can down gauge their film products and still retain packaging performance.

Previous attempts were made to optimize film tensile strength and yield strength by blending various heterogeneous polymers together on theoretical basis. While such blends exhibited a synergistic response to increase the film yield strength, the film impact strength followed the rule of mixing, often resulting in a "destructive synergism" (i.e., the film impact strength was actually lower than film made from one of the two components used to make the blend).

For example, it is known that while improved modulus linear polyethylene resin can be produced by blending high density polyethylene with a very low density polyethylene (VLDPE), the impact strength of the resin blend follows the rule of mixing.

There is a continuing need to develop polymers which can be formed into fabricated articles (e.g., film) having these combinations of properties (e.g., improved modulus, yield strength, impact strength and tear strength). The need is especially great for polymers which can be made into film which can also be down gauged without loss of strength properties, resulting in savings for film manufacturers and consumers, as well as protecting the environment by source reduction.

Surprisingly, we have now discovered that film can have synergistically enhanced physical properties, when the film is made from a blend of at least one homogeneously branched ethylene/α-olefin interpolymer and a heterogeneously branched ethylene/α-olefin interpolymer.

BRIEF DESCRIPTION OF THE DRAWINGS

FIG. 1 shows the relationship between the density and the slope of strain hardening coefficient for homogeneously branched substantially linear ethylene/α-olefin interpolymers used in the compositions disclosed herein, in comparison with a heterogeneously branched ethylene/α-olefin copolymer.

FIG. 2 shows the short chain branching distribution (as measured by analytical temperature rising elution fractionation (ATREF)) for a homogeneously branched substantially linear ethylene/1-octene copolymer used in the invention, in comparison with Dowlex™ 2045 (a heterogeneously branched ethylene/1-octene copolymer made by The Dow Chemical Company).

SUMMARY OF THE INVENTION

Formulated ethylene/α-olefin compositions have now been discovered to have improved physical and mechanical strength and are useful in making fabricated articles. Films made from these novel compositions exhibit surprisingly good impact and tensile properties, and an especially good combination of modulus, yield, ultimate tensile, and toughness (e.g., Dart impact).

The compositions comprise (A) from about 10 percent (by weight of the total composition) to about 95 percent (by weight of the total composition) of
at least one homogeneously branched substantially linear ethylene/α-olefin interpolymer having:
(i) a density from about 0.89 grams/cubic centimeter (g/cm$^3$) to about 0.92 g/cm$^3$,
(ii) a molecular weight distribution ($M_w/M_n$) from about 1.8 to about 2.8,
(iii) a melt index ($I_2$) from about 0.001 grams/10 minutes (g/10 min) to about 10 g/10 min,
(iv) no linear polymer fraction, and
(v) a single melting peak as measured using differential scanning calorimetry; and
(B) at least one heterogeneously branched ethylene polymer having a density from about 0.93 g/cm$^3$ to about 0.965 g/cm$^3$.

In another aspect, the compositions comprise from about 10 percent (by weight of the total composition) to about 95 percent (by weight of the total composition) of:
(A) at least one homogeneously branched linear ethylene/α-olefin interpolymer having:
(i) a density from about 0.89 grams/cubic centimeter (g/cm$^3$) to about 0.92 g/cm$^3$,
(ii) a molecular weight distribution ($M_w/M_n$) from about 1.8 to about 2.8,
(iii) a melt index ($I_2$) from about 0.001 grams/10 minutes (g/10 min) to about 10 g/10 min,
(iv) no linear polymer fraction, and
(v) a single melting peak as measured using differential scanning calorimetry; and
(B) at least one heterogeneously branched ethylene polymer having a density from about 0.93 g/cm$^3$ to about 0.965 g/cm$^3$.

Preferably, both the homogeneously branched substantially linear ethylene/α-olefin interpolymer and the homogeneously branched linear ethylene/α-olefin interpolymer each have a slope of strain hardening coefficient greater than or equal to about 1.3.

DETAILED DESCRIPTION OF THE INVENTION

The homogeneously branched ethylene/α-olefin interpolymer is preferably a homogeneously branched substantially linear ethylene/α-olefin interpolymer as described in pending U.S. Ser. No. 07/776,130 now U.S. Pat. No. 5,272,236. The homogeneously branched ethylene/α-olefin interpolymer can also be a linear ethylene/α-olefin interpolymer as described in U.S. Pat. No. 3,645,992 (Elston), the disclosure of which is incorporated herein by reference.

The substantially linear ethylene/α-olefin interpolymers are not "linear" polymers in the traditional sense of the term, as used to describe linear low density polyethylene (e.g., Ziegler polymerized linear low density polyethylene (LLDPE)), nor are they highly branched polymers, as used to describe low density polyethylene (LDPE).

The substantially linear ethylene/α-olefin interpolymers of the present invention are herein defined as in copending application Ser. No. 07/776,130 now U.S. Pat. No. 5,272,236 and in copending application entitled "Elastic Substantially Linear Olefin Polymers" filed Sep. 2, 1992 in the names of Shih-Yaw Lai, George W. Knight, John R. Wilson and James C. Stevens.

The homogeneously branched ethylene/α-olefin interpolymers useful for forming the compositions described herein are those in which the comonomer is randomly distributed within a given interpolymer molecule and wherein substantially all of the interpolymer molecules have the same ethylene/comonomer ratio within that interpolymer. The homogeneity of the interpolymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin polymers of the present invention is preferably greater than about 30 percent, especially greater than about 50 percent. The homogeneous ethylene/α-olefin polymers used in this invention essentially lack a measurable "high density" fraction as measured by the TREF technique (i.e., the homogeneously branched ethylene/α-olefin polymers do not contain a polymer fraction with a degree of branching less than or equal to 2 methyls/1000 carbons). The homogeneously branched ethylene/α-olefin polymers also do not contain any highly short chain branched fraction (i.e., the homogeneously branched ethylene/α-olefin polymers do not contain a polymer fraction with a degree of branching equal to or more than about 30 methyls/ 1000 carbons).

The substantially linear ethylene/α-olefin interpolymers for use in the present invention typically are interpolymers of ethylene with at least one $C_3$–$C_{20}$ α-olefin and/or $C_4$–$C_{18}$ diolefins. Copolymers of ethylene and 1-octene are especially preferred. The term "interpolymer" is used herein to indicate a copolymer, or a terpolymer, or the like. That is, at least one other comonomer is polymerized with ethylene to make the interpolymer. Ethylene copolymerized with two or more comonomers can also be used to make the homogeneously branched substantially linear interpolymers useful in this invention. Preferred comonomers include the $C_3$–$C_{20}$ α-olefins, especially propene, isobutylene, 1-butene, 1-hexene, 4-methyl-1-pentene, 1-heptene, 1-octene, 1-nonene, and 1-decene, more preferably 1-butene, 1-hexene, 4-methyl-1-pentene and 1-octene.

The term "linear ethylene/α-olefin interpolymer" means that the interpolymer does not have long chain branching. That is, the linear ethylene/α-olefin interpolymer has an absence of long chain branching, as for example the linear low density polyethylene polymers or linear high density polyethylene polymers made using uniform (i.e., homogeneous) branching distribution polymerization processes (e.g., as described in U.S. Pat. No. 3,645,992 (Elston)) and are those in which the comonomer is randomly distributed within a given interpolymer molecule and wherein substantially all of the interpolymer molecules have the same ethylene/comonomer ratio within that interpolymer. The term "linear ethylene/α-olefin interpolymer" does not refer to high pressure branched (free-radical polymerized) polyethylene which is known to those skilled in the art to have numerous long chain branches. The branching distribution of the homogeneously branched linear ethylene/α-olefin interpolymers is the same or substantially the same as that described for the homogeneously branched substantially linear ethylene/α-olefin interpolymers, with the exception that the linear ethylene/α-olefin interpolymers do not have any long chain branching. The homogeneously branched linear ethylene/α-olefin interpolymers comprise ethylene with at least one $C_3$–$C_{20}$ α-olefin and/or $C_4$–$C_{18}$ diolefin. Copolymers of ethylene and 1-octene are especially preferred. Preferred comonomers include the $C_3$–$C_{20}$ α-olefins, especially propene, isobutylene, 1-butene, 1-hexene, 4-methyl-1 -pentene, 1-heptene, 1-octene, 1-nonene, and 1-decene, more preferably 1-butene, 1-hexene, 4-methyl-1-pentene and 1-octene.

Both the homogeneously branched substantially linear and linear ethylene/α-olefin interpolymers have a single melting point, as opposed to traditional heterogeneously branched Ziegler polymerized ethylene/α-olefin copolymers having two or more melting points, as determined using differential scanning calorimetry (DSC).

The density of the homogeneously branched linear or substantially linear ethylene/α-olefin interpolymers (as measured in accordance with ASTM D-792) for use in the present invention is generally from about 0.89 g/cm$^3$ to about 0.935 g/cm$^3$, preferably from about 0.905 g/cm$^3$ to about 0.925 g/cm$^3$, and especially from about 0.905 g/cm$^3$ to less than about 0.92 g/cm$^3$.

The amount of the homogeneously branched linear or substantially linear ethylene/α-olefin polymer incorporated into the composition varies depending upon the heterogeneously branched ethylene polymer to which it is combined. However, about 50 percent (by weight of the total composition) of the homogeneous linear or substantially linear ethylene/α-olefin polymer is especially preferred in the novel compositions disclosed herein.

The molecular weight of the homogeneously branched linear or substantially linear ethylene/α-olefin interpolymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The lower melt index limit for the homogeneously branched linear or substantially linear ethylene/α-olefin interpolymers useful herein is generally about 0.001 grams/10 minutes (g/10 min). The upper melt index limit for the homogeneously branched linear or substantially linear ethylene/α-olefin interpolymers is about 10 g/10 min, preferably less than about 1 g/10 min, and especially less than about 0.5 g/10 min.

Another measurement useful in characterizing the molecular weight of the homogeneously branched linear or substantially linear ethylene/α-olefin interpolymers is conveniently indicated using a melt index measurement according to ASTM D-1238, Condition 190° C./10 kg (formerly known as "Condition (N)" and also known as $I_{10}$). The ratio of the $I_{10}$ and $I_2$ melt index terms is the melt flow ratio and is designated as $I_{10}/I_2$. Generally, the $I_{10}/I_2$ ratio for the homogeneously branched linear ethylene/α-olefin interpolymers is about 5.6. For the homogeneously branched substantially linear ethylene/α-olefin interpolymers used in the compositions of the invention, the $I_{10}/I_2$ ratio indicates the degree of long chain branching, i.e., the higher the $I_{10}/I_2$ ratio, the more long chain branching in the interpolymer. Generally, the $I_{10}/I_2$ ratio of the homogeneously branched substantially linear ethylene/α-olefin interpolymers is at least about 6, preferably at least about 7, especially at least about 8 or above. For the homogeneously branched substantially linear ethylene/α-olefin interpolymers, the higher the $I_{10}/I_2$ ratio, the better the processability.

Other additives such as antioxidants (e.g., hindered phenolics (e.g., Irganox® 1010 made by Ciba Geigy Corp.), phosphites (e.g., Irgafos® 168 also made by Ciba Geigy Corp.)), cling additives (e.g., PIB), antiblock additives, pigments, fillers, and the like can also be included in the formulations, to the extent that they do not interfere with the enhanced formulation properties discovered by Applicants.

Molecular Weight Distribution Determination

The molecular weight distribution of the linear or substantially linear olefin interpolymer product samples is analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliter/minute and the injection size is 200 microliters. A differential refractometer is being used as the detector.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For both the homogeneously branched linear and substantially linear ethylene/α-olefin polymers, the molecular weight distribution ($M_w/M_n$) is preferably from about 1.8 to about 2.8, more preferably from about 1.89 to about 2.2 and especially about 2.

Determination of the Slope of Strain Hardening Coefficient

The slope of strain hardening is measured by compression molding a plaque from the polymer to be tested. Typically, the plaque is molded at about 177° C. for 4 minutes under almost no pressure and then pressed for 3 minutes under a pressure of about 200 psi. The plaque is then allowed to cool at about 8° C./minute while still under 200 psi pressure. The molded plaque has a thickness of about 0.005 inches. The plaque is then cut into a dogbone shaped test piece using a steel rule die. The test piece is 0.315 inches wide and 1.063 inches long. The start of the curved portion of the dogbone shape begins at 0.315 inches from each end of the sample and gently curves (i.e., tapers) to a width of 0.09 inches. The curve ends at a point 0.118 inches from the start of the curve such that the interior portion of the dogbone test piece has a width of 0.09 inches and a length of 0.197 inches.

The tensile properties of the test sample is tested on an Instron Tensile Tester at a crosshead speed of 1 inch/minute. The slope of strain hardening is calculated from the resulting tensile curve by drawing a line parallel to the strain hardening region of the resulting stress/strain curve. The strain hardening region occurs after the sample has pulled its initial load ((i.e., stress) usually with little or no elongation during the initial load) and after the sample has gone through a slight drawing stage (usually with little or no increase in load, but with increasing elongation (i.e., strain)). In the strain hardening region, the load and the elongation of the sample both continue to increase. The load increases in the strain hardening region at a much lower rate than during the initial load region and the elongation also increase, again at a rate lower than that experienced in the drawing region. FIG. 1 shows the various stages of the stress/strain curve used to calculate the slope of strain hardening. The slope of the parallel line in the strain hardening region is then determined.

The slope of strain hardening coefficient (SHC) is calculated according to the following equation:

$$SHC = (slope\ of\ strain\ hardening) * (I_2)^{0.25}$$

where $I_2$=melt index in grams/10 minutes.

For both the homogeneously branched linear and substantially linear ethylene/α-olefin interpolymers used in the invention, the SHC is greater than about 1.3, preferably greater than about 1.5.

Surprisingly, the slope of strain hardening coefficient reaches a maximum for the linear or the substantially linear ethylene/α-olefin polymers at a density from about 0.89 g/cm³ to about 0.935 g/cm³. Heterogeneous ethylene/α-olefin polymers, in contrast, do not behave in the same manner. FIG. 1 graphically depicts the relationship between the density of the homogeneously branched substantially linear ethylene polymers and ethylene/α-olefin polymers as a function of their slope of strain hardening coefficient, and includes a heterogeneously branched ethylene/1-octene copolymer (polymer W** in Table 1) for comparison purposes. Table 1 displays the data of FIG. 1 in tabular form:

TABLE 1

| Polymer | Melt Index ($I_2$) (g/10 min) | Density (g/cm³) | $I_{10}/I_2$ | SHC* |
|---|---|---|---|---|
| A | 1 | 0.8564 | 7.36 | 0.004 |
| B | 1.03 | 0.8698 | 7.46 | 0.45 |
| C | 0.57 | 0.873 | 7.22 | 0.54 |
| D | 1.01 | 0.8817 | 7.36 | 0.89 |
| E | 1.06 | 0.9018 | 7.61 | 1.84 |
| F | 2.61 | 0.9041 | 8.07 | 2.03 |
| G | 0.77 | 0.9047 | 9.01 | 1.57 |
| H | 9.82 | 0.9048 | 7.03 | 1.67 |
| I | 4.78 | 0.9077 | 7.18 | 2.08 |
| J | 3.13 | 0.9113 | 7.67 | 2.04 |
| K | 2.86 | 0.9139 | 7.87 | 2.27 |
| L | 1.08 | 0.9197 | 8.07 | 2.24 |
| M | 0.96 | 0.9198 | 9.61 | 1.93 |
| N | 0.99 | 0.9203 | 9.09 | 2.23 |
| O | 1.11 | 0.9204 | 10.15 | 1.59 |
| P | 1.06 | 0.9205 | 9.08 | 2.25 |
| Q | 1.12 | 0.9216 | 8.94 | 2.3 |
| R | 30.74 | 0.9217 | 6.27 | 2 |
| S | 31.58 | 0.94 | 6.02 | 0.24 |
| T | 0.97 | 0.9512 | 12.11 | 0 |
| U | 0.97 | 0.9533 | 10.5 | 0 |
| V | 0.92 | 0.954 | 7.39 | 0 |
| W** | 0.8 | 0.905 | 8.7 | 1.02 |

*SHC = Slope of Strain Hardening Coefficient
**A comparative heterogeneously branched ethylene/1-octene copolymer The Heterogeneously Branched Ethylene Polymer The ethylene polymer to be combined with the homogeneous ethylene/α-olefin interpolymer is a heterogeneously branched (e.g., Ziegler polymerized) interpolymer of ethylene with at least one $C_3$–$C_{20}$ α-olefin (e.g., linear low density polyethylene (LLDPE)).

Heterogeneously branched ethylene/α-olefin interpolymers differ from the homogeneously branched ethylene/α-olefin interpolymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, linear homopolymer polyethylene has neither branched nor highly branched fractions, but is linear. A very low density heterogeneous polyethylene having a density from about 0.9 g/cm³ to about 0.915 g/cm³ (such as Attane® copolymers, sold by The Dow Chemical Company and Flexomer® sold by Union Carbide Corporation) has a higher percentage of the highly short chain branched fraction, thus lowering the density of the whole polymer.

Heterogeneously branched LLDPE (such as Dowlex® sold by The Dow Chemical Company) has a lower amount of the highly branched fraction, but has a greater amount of the medium branched fraction. FIG. 2 graphically depicts the relative amounts of these various fractions (as measured using temperature rising elution fractionation) for Dowlex® 2045 (a heterogeneously branched ethylene/1-octene copolymer having a melt index ($I_2$) of about 1 g/10 min, a density of about 0.92 g/cm³, a melt flow ratio ($I_{10}/I_2$) of about 7.93 and a molecular weight distribution ($M_w/M_n$) of about 3.34), as compared with a homogeneously branched substantially linear ethylene/1-octene copolymer having a melt index ($I_2$) of about 1 g/10 min, a density of about 0.92 g/cm³, a melt flow ratio ($I_{10}/I_2$) of about 10.5 and a molecular weight distribution ($M_w/M_n$) of about 2.18. Note that the homogeneously branched polymer has a single relatively narrow peak at an elution temperature of about 85° C., while the Dowlex® 2045 polymer has a broad branching distribution, as represented by the breadth of elution temperatures over which the polymer fractions elute. Dowlex® 2045 also has a distinct peak at an elution temperature of about 98° C., indicating the "linear" fraction of the whole polymer. Increasing the fraction of the polymer which has the beneficial properties, without concomitantly increasing other fractions has not been demonstrated here-to-fore.

Preferably, however, the heterogeneously branched ethylene polymer is a heterogeneously branched Ziegler polymerized ethylene/α-olefin interpolymer having no more than about 10 percent (by weight of the polymer) of a polymer fraction having a SHC≧1.3.

More preferably, the heterogeneously branched ethylene polymer is a copolymer of ethylene with a $C_3$–$C_{20}$ α-olefin, wherein the copolymer has:

(i) a density from about 0.93 g/cm³ to about 0.965 g/cm³, (ii) a melt index ($I_2$) from about 0.1 g/10 min to about 500 g/10 min, and (iii) no more than about 10 percent (by weight of the polymer) of a polymer fraction having a SHC≧1.3.

The heterogeneously branched ethylene/α-olefin interpolymers and/or copolymers also have at least two melting peaks as determined using Differential Scanning Calorimetry (DSC).

The Formulated Compositions

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin screw extruder).

Another technique for making the compositions in-situ is disclosed in pending U.S. Ser. No. 08/010,958, now abandoned entitled Ethylene Interpolymerizations, which was filed Jan. 29, 1993 in the names of Brian W. S. Kolthammer and Robert S. Cardwell, the disclosure of which is incorporated herein in its entirety by reference. U.S. Ser. No. 08/010,958 now abandoned describes, inter alia, interpolymerizations of ethylene and $C_3$–$C_{20}$ alpha-olefins using a homogeneous catalyst in at least one reactor and a heterogeneous catalyst in at least one other reactor. The reactors can be operated sequentially or in parallel.

The compositions can also be made by fractionating a heterogeneous ethylene/α-olefin polymer into specific polymer fractions with each fraction having a narrow composition (i.e., branching) distribution, selecting the fraction having the specified properties (e.g., SHC≧1.3), and blending the selected fraction in the appropriate amounts with another ethylene polymer. This method is obviously not as economical as the in-situ interpolymerizations of U.S. Ser. No. 08/010,958, but can be used to obtain the compositions of the invention.

Fabricated Articles Made from the Novel Compositions

Many useful fabricated articles benefit from the novel compositions disclosed herein. For example, molding operations can be used to form useful fabricated articles or parts from the compositions disclosed herein, including various injection molding processes (e.g., that described in *Modern Plastics Encyclopedia*/89, Mid October 1988 Issue, Volume 65, Number 11, pp. 264–268, "Introduction to Injection Molding" by H. Randall Parker and on pp. 270–271, "Injection Molding Thermoplastics" by Michael W. Green, the disclosures of which are incorporated herein by reference) and blow molding processes (e.g., that described in *Modern Plastics Encyclopedia*/89, Mid October 1988 Issue, Volume 65, Number 11, pp. 217–218, "Extrusion-Blow Molding" by Christopher Irwin, the disclosure of which is incorporated herein by reference), profile extrusion, calandering, pultrusion (e.g., pipes) and the like. Rotomolded articles can also benefit from the novel compositions described herein. Rotomolding techniques are well known to those skilled in the art and include, for example, those described in *Modern Plastics Encyclopedia*/89, Mid October 1988 Issue, Volume 65, Number 11, pp. 296–301, "Rotational Molding" by R. L. Fair, the disclosure of which is incorporated herein by reference).

Fibers (e.g., staple fibers, melt blown fibers or spunbonded fibers (using, e.g., systems as disclosed in U.S. Pat. No. 4,340,563, U.S. Pat. No. 4,663,220, U.S. Pat. No. 4,668,566, or U.S. Pat. No. 4,322,027, all of which are incorporated herein by reference), and gel spun fibers (e.g., the system disclosed in U.S. Pat. No. 4,413,110, incorporated herein by reference)), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton)) can also be made from the novel compositions disclosed herein.

Film and film structures particularly benefit from the novel compositions described herein and can be made using conventional hot blown film fabrication techniques or other biaxial orientation processes such as tenter frames or double bubble processes. Conventional hot blown film processes are described, for example, in *The Encyclopedia of Chemical Technology*, Kirk-Othmer, Third Edition, John Wiley & Sons, New York, 1981, Vol. 16, pp. 416–417 and Vol. 18, pp. 191–192, the disclosures of which are incorporated herein by reference. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), the disclosures of each of which are incorporated herein by reference, can also be used to make film structures from the novel compositions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by TAPPI Press (1992)) the disclosures of which are incorporated herein by reference.

The films may be monolayer or multilayer films. The film made from the novel compositions can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, Jun. 15–17 (1981), pp. 211–229, the disclosure of which is incorporated herein by reference. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992), the disclosure of which is incorporated herein by reference, also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic add (EAA) copolymers, ethylene/methacrylic add (EMAA) copolymers, LLDPE, HDPE, LDPE, nylon, graft adhesive polymers (e.g., maleic anhydride grafted polyethylene), and paper. Generally, the multilayer film structures comprise from 2 to about 7 layers.

EXAMPLE 1

Seventy five percent (by weight of the total composition) of a homogeneously branched substantially linear ethylene/1-octene copolymer having $I_2$ of about 1 g/10 min, density of about 0.91 g/cm$^3$, $I_{10}/I_2$ of about 10, $M_w/M_n$ of about 2, and SHC of about 1.81 is dry blended and then melt blended with 25 percent (by weight of the total composition) of a heterogeneously branched ethylene/1-octene copolymer having $I_2$ of about 1 g/10 min, density of about 0.935 g/cm$^3$, $I_{10}/I_2$ of about 7.8, and $M_w/M_n$ of about 3.4. The heterogeneously branched ethylene/1-octene copolymer has a fraction of about 5 percent (by weight of the heterogeneously branched copolymer) having a SHC$\geq$1.3. The dry blend is tumble blended in a 50 gallon drum for about 1 hour.

The melt blend is produced in a ZSK 30 twin screw extruder (30 mm screw diameter) and is then fabricated into film. The final blended composition has a density of about 0.919 g/cm$^3$.

The blended composition is then fabricated into blown film having a thickness of about 1 mil on an Egan Blown Film Line having a 2 inch diameter screw, a 3 inch die and at a 2.5 inch blow up ratio (BUR), as described in Table 2. For all film samples in Examples 1, 2, 4, and 6 and for comparative examples 3, 5, and 7, the targeted gauge is about 1 mil, using a blow-up ratio (BUR) of 2.5:1, a LLDPE screw design is used, a die gap of 70 mils is used, and a lay flat of about 11.875 inches is used.

Film properties are measured and reported in Table 3 with other examples of the invention and with comparative examples. Dart impact (type A) of the films is measured in accordance with ASTM D-1709-85; tensile strength, yield, toughness, and 2% secant modulus of the films is measured in accordance with ASTM D-882; Elmendorf tear (type B) is measured in accordance with ASTM D-1922; PPT tear is measured in accordance with ASTM D-2582; Block is measured in accordance with ASTM D-3354.

Puncture is measured by using an Instron tensiometer Tensile Tester with an integrator, a specimen holder that holds the film sample taut across a circular opening, and a rod-like puncturing device with a rounded tip (ball) which is attached to the cross-head of the Instron and impinges perpendicularly onto the film sample. The Instron is set to obtain a crosshead speed of 10 inches/minute and a chart speed (if used) of 10 inches/minute. Load range of 50% of the load cell capacity (100 lb. load for these tests) should be used. The puncturing device is installed to the Instron such that the clamping unit is attached to the lower mount and the ball is attached to the upper mount on the crosshead. Six film specimens are used (each 6 inches square). The specimen is clamped in the film holder and the film holder is secured to the mounting bracket. The crosshead travel is set and continues until the specimen breaks. Puncture resistance is defined as the energy to puncture divided by the volume of the film under test. Puncture resistance (PR) is calculated as follows:

$$PR = E/((12)(T)(A))$$

where

PR=puncture resistance (ft-lbs/in$^3$)

E=energy (inch-lbs)=area under the load displacement curve

12=inches/foot

T=film thickness (inches), and

A=area of the film sample in the clamp=12.56 in$^2$.

EXAMPLE 2

Seventy five percent (by weight of the total composition) of a homogeneously branched substantially linear ethylene/ 1-octene copolymer having $I_2$ of about 0.5 g/10 min, density of about 0.915 g/cm$^3$, $I_{10}/I_2$ of about 11, $M_w/M_n$ of about 24, and SHC of about 2.265 is dry blended and then melt blended (as described in Example 1) with 25 percent (by weight of the total composition) of a heterogeneously branched ethylene/1-octene copolymer having $I_2$ of about 1 g/10 min, density of about 0.935 g/cm$^3$, $I_{10}/I_2$ of about 7.8, and $M_w/M_n$ of about 3.4. The heterogeneously branched ethylene/1-octene copolymer has a fraction of about 5 percent (by weight of the heterogeneously branched copolymer) having a SHC≧1.3. The final blended composition has a density of about 0.92 g/cm$^3$.

Blown film is made as described in Table 2 and film properties are measured and reported in Table 3 with other examples of the invention and with comparative examples.

COMPARATIVE EXAMPLE 3

A heterogeneously branched ethylene/1-octene copolymer having $I_2$ of about 1 g/10 min, density of about 0.92 g/cm$^3$, $I_{10}/I_2$ of about 7.93, and $M_w/M_n$ of about 3.34 is made into film as described in Example 1. The heterogeneously branched ethylene/1-octene copolymer has a fraction of about 36 percent (by weight of the heterogeneous copolymer) having a SHC≧1.3. The entire heterogeneous ethylene/1-octene copolymer has a SHC of about 1.5.

Blown film is made as described in Table 2 and film properties are measured and reported in Table 3 with other examples of the invention and with comparative examples.

EXAMPLE 4

Example 4 is an in-situ blend made according to U.S. Ser. No. 08/010,958, now abandoned wherein the homogeneously branched substantially linear polymer is made in a first reactor and is an ethylene/1-octene copolymer having a melt index ($I_2$) of about 0.5 g/10 min., and a density of about 0.9054 g/cm$^3$, a melt flow ratio ($I_{10}/I_2$) of about 8.27 and a molecular weight distribution ($M_w/M_n$) of about 1.979 and comprises about 50% (by weight of the total composition). A heterogeneously branched ethylene/1-octene copolymer is made in a second reactor operated sequentially with the first reactor and has a melt index ($I_2$) of about 1.5 g/10 min., and a density of about 0.944 g/cm$^3$ and comprises the remaining 50% (by weight of the total composition). The total composition has a melt index ($I_2$) of about 1 g/10 min., a density of about 0.9248 g/cm$^3$, a melt flow ratio ($I_{10}/I_2$) of about 7.22 and a molecular weight distribution ($M_w/M_n$) of about 2.641. This composition is made into blown film as described in Table 2 and the resultant film properties are reported in Table 3.

COMPARATIVE EXAMPLE 5

Comparative Example 5 is an ethylene/1-octene copolymer made according to U.S. Ser. No. 07/773,375, filed Oct. 7, 1991, now U.S. Pat. No. 5,250,612 the disclosure of which is incorporated herein by reference. About 15% (by weight of the total composition) is made in a first reactor, with the remaining portion of the composition polymerized in a second sequentially operated reactor. Both reactors utilize Ziegler type catalysts and make heterogeneously branched polymers. The total composition has a melt index ($I_2$) of about 0.56 g/10 min., a density of about 0.9256 g/cm$^3$, a melt flow ratio ($I_{10}/I_2$) of about 9.5 and a molecular weight distribution ($M_w/M_n$) of about 4.35. This composition is also made into blown film as described in Table 2 and the resultant film properties are reported in Table 3.

EXAMPLE 6

Example 6 is an in-situ blend made according to U.S. Ser. No. 08/010,958, wherein the homogeneously branched substantially linear polymer is made in a first reactor and is an ethylene/l-octene copolymer having a fractional melt index ($I_2$), a density of about 0.906 g/cm$^3$, a melt flow ratio ($I_{10}/I_2$) of about 8–10 and a molecular weight distribution ($M_w/M_n$) of about 2.2 and comprises about 43% (by weight of the total composition). A second heterogeneously branched ethylene/ 1-octene copolymer is made in a second reactor operated sequentially with the first reactor and has a melt index ($I_2$) of about 0.85 g/10 minutes, a density of about 0.938 g/cm$^3$ and comprises the remaining 57% (by weight of the total composition). The total composition has a melt index ($I_2$) of about 0.53 g/10 minutes, a density of about 0.9246 g/cm$^3$, a melt flow ratio ($I_{10}/I_2$) of about 7.83, and a molecular weight distribution ($M_w/M_n$) of about 2.8. This composition is made into blown film as described in Table 2 and the film properties are reported in Table 3.

COMPARATIVE EXAMPLE 7

Comparative Example 7 is an ethylene/1-octene copolymer made according to U.S. Ser. No. 07/773,375, filed Oct. 7, 1991, now U.S. Pat. No. 5,250,612 the disclosure of which is incorporated herein by reference. About 25% (by weight of the total composition) is made in a first reactor, with the remaining portion of the composition polymerized in a second sequentially operated reactor. Both reactors utilize Ziegler type catalysts and make heterogeneously branched polymers. The total composition has a melt index ($I_2$) of about 0.49 g/10 min., a density of about 0.9244 g/cm$^3$, a melt flow ratio ($I_{10}/I_2$) of about 10 and a molecular weight distribution ($M_w/M_n$) of about 4.78. This composition is also made into blown film as described in Table 2 and the resultant film properties are reported in Table 3.

COMPARATIVE EXAMPLE 8

Comparative example 8 is a heterogeneously branched ethylene/1-octene copolymer having a melt index ($I_2$) of about 1 g/10 minutes, a density of about 0.9249 g/cm³, a melt flow ratio ($I_{10}/I_2$) of about 8 and a molecular weight distribution ($M_w/M_n$) of about 3.5.

Blown film is made as described in Table 2 and film properties are measured and reported in Table 3 with other examples of the invention and comparative examples.

TABLE 2

|  | Ex. 1 | Ex. 2 | Comp. Ex. 3 | Ex. 4 | Comp. Ex. 5 | Ex. 6 | Comp. Ex. 7 | Comp. Ex. 8 |
|---|---|---|---|---|---|---|---|---|
| Zone 1A (°F.) | 300 | 300 | 300 | 300 | 300 | 300 | 300 | 300 |
| Zone 1B (°F.) | 450 | 451 | 475 | 474 | 475 | 475 | 475 | 474 |
| Zone 1C (°F.) | 450 | 450 | 475 | 475 | 475 | 475 | 475 | 475 |
| Zone 2A (°F.) | 450 | 450 | 475 | 474 | 475 | 475 | 475 | 475 |
| Zone 2B (°F.) | 450 | 450 | 455 | 475 | 475 | 475 | 475 | 475 |
| Zone 2C (°F.) | 450 | 450 | 475 | 475 | 475 | 475 | 475 | 475 |
| Zone 3 (°F.) | 451 | 452 | 474 | 477 | 477 | 476 | 476 | 474 |
| Zone 4 (°F.) | 450 | 450 | 473 | 475 | 475 | 475 | 475 | 475 |
| Zone 5 (°F.) | 450 | 450 | 475 | 475 | 475 | 475 | 475 | 475 |
| Melt temp. (°F.) | 475 | 477 | 515 | 501 | 502 | 499 | 499 | 497 |
| Blower Air temp. (°F.) | 47.3 | 45.7 | 57 | 44.4 | 86.5 | 47.6 | NA | 473 |
| Chill Water temp. (°F.) | 39 | 37.6 | 51.1 | 38.3 | 86.8 | 40 | 38.7 | 40.5 |
| Extruder Die press. (psi) | 2843 | 3427 | 1321 | 1874 | 1763 | 2883 | 2525 | 1952 |
| Nozzle press (in.) | 3.2 | 4.5 | 4.38 | 4.4 | 4.9 | 4.6 | 4.6 | 4.3 |
| Amps | 27.3 | 33.1 | 37.7 | 39.9 | 40.2 | 50.1 | 42.6 | 38.6 |
| Extruder speed (rpm) | 27.6 | 28.8 | 21.5 | 23.1 | 21.1 | 21.5 | 22.1 | 21.7 |
| Nip Roll speed (rpm) | 33.1 | 36.9 | 39 | 39.8 | 36.2 | 37 | 36 | 37.8 |
| Output (lbs/hr) | 31 | NR* | 38.3 | 39 | NR* | 36 | 36 | 36 |
| Frostline height (in.) | 12.5 | 9 | 13 | 12 | 12 | 10.5 | 11 | 10.5 |

*NR = Not recorded

TABLE 3

|  | Ex. 1 | Ex. 2 | Comp. Ex. 3 | Ex. 4 | Comp. Ex. 5 | Ex. 6 | Comp. Ex. 7 | Comp. Ex. 8 |
|---|---|---|---|---|---|---|---|---|
| Yield (MD*) (psi) | 1605 | 1595 | 1643 | 2040 | 2243 | 1973 | 1810 | 1782 |
| Tensile (MD*) (psi) | 8522 | 9525 | 7444 | 7794 | 7931 | 9325 | 8455 | 4928 |
| Toughness (MD*) (ft-lbs/in³) | 1689 | 1773 | 1439 | 1671 | 1519 | NR | NR | NR |
| Yield (CD**) (psi) | 1530 | 1489 | 1706 | 2267 | 2407 | 1997 | 1809 | 1832 |
| Tensile (CD**) (psi) | 6252 | 7603 | 5807 | 7079 | 7458 | 7153 | 6326 | 4598 |
| Toughness (CD**) (ft-lbs/in³) | 1282 | 1599 | 1358 | 1656 | 1495 | NR | NR | NR |
| Elmendorf B (MD*) (grams) | 288 | 216 | 334 | 317 | 194 | 320 | 398 | 297 |
| Elmendorf B (CD**) (grams) | 621 | 566 | 413 | 630 | 664 | 640 | 621 | 527 |
| PPT Tear (MD*) (lbs.) | 6.79 | 6.18 | 5.99 | 6.2 | 6.5 | 6.2 | 6.2 | 5.3 |
| PPT Tear (CD**) (lbs.) | 7.44 | 7.42 | 6.46 | 6.8 | 8.1 | 7.0 | 7.5 | 6.1 |
| Dart Impact A (grams) | 708 | 610 | 354 | 410 | 186 | 412 | 186 | 164 |
| Puncture (ft-lbs/in³) | 316 | 349 | 251 | 231 | 256 | 250 | 227 | 237 |
| Film Block g. | 75 | 33 | 87 | 32 | 17 | 11.8 | 17 | 22 |
| Film Gradient Density (g/cm³) | 0.9145 | 0.9153 | 0.9155 | 0.9205 | 0.9218 | 0.9198 | 0.9201 | 0.9207 |
| Film Gauge (low) (mils) | 0.9 | 0.9 | 0.9 | 0.85 | 0.8 | 0.98 | 0.95 | 1.05 |
| Film Gauge (high) (mils) | 1.2 | 1.05 | 1.1 | 0.95 | 1 | 1.08 | 1.05 | 1.15 |

*MD = Machine direction
**CD = Cross direction
NR = Not Recorded

In general, films made from the novel formulated ethylene/α-olefin compositions exhibit good impact and tensile properties, and an especially good combination of tensile, yield and toughness (e.g., toughness and dart impact). Further, films from the example resins exhibited significant improvements over films made from the comparative resins in a number of key properties.

For example, comparing examples 1 and 2 with comparative example 3, the data show films produced from the melt blends (examples 1 and 2) exhibited significantly higher values for the following film properties: dart impact, MD tensile, CD tensile, MD toughness, CD toughness MD ppt tear, CD ppt tear, CD Elmendorf tear B, puncture and significantly lower block.

Comparing example 4 to comparative example 5, the data show films produced from the in-situ blend (made according to U.S. Ser. No. 08/010,958 now abandoned) exhibited significantly higher values for the following film properties: dart impact, MD toughness and CD toughness.

Comparing example 6 to comparative examples 7 (an ethylene/1-octene copolymer made according to U.S. Ser. No. 07/773,375 now U.S. Pat. No. 5,250,612) and 8 (an heterogeneously branched ethylene/1-octene copolymer), the data show films produced from the in-situ blend (made according to U.S. Ser. No. 08/010,958) exhibited significantly higher values for the following film properties: dart impact, MD yield, CD yield, MD tensile, CD tensile, CD Elmendorf tear B and puncture and significantly lower block.

We claim:

1. A film made from an ethylene polymer composition, wherein the composition comprises (A) from about 10 percent (by weight of the total composition) to about 95 percent (by weight of the total composition) of at least one homogeneously branched linear ethylene/α-olefin interpolymer having:
   (i) a density from about 0.89 grams/cubic centimeter (g/cm$^3$) to about 0.935 g/cm$^3$,
   (ii) a molecular weight distribution ($M_w/M_n$) from about 1.8 to about 2.8,
   (iii) a melt index ($I_2$) from about 0.001 grams/10 minutes (g/10 min) to about 10 g/10 min,
   (iv) no high density fraction,
   (v) a single melting peak as measured using differential scanning calorimetry, and
   (vi) a slope of strain hardening coefficient greater than or equal to 1.3; and
(B) from about 5 percent (by weight of the total composition) to about 90 percent (by weight of the total composition) of at least one heterogeneously branched linear ethylene polymer having a density from about 0.93 g/cm$^3$ to about 0.965 g/cm$^3$.

2. The film of claim 1 wherein the homogeneously branched linear ethylene interpolymer has a slope of strain hardening coefficient greater than or equal to 1.5.

3. The film of claim 1 wherein the homogeneously branched linear ethylene/α-olefin interpolymer is an interpolymer of ethylene with at least one $C_3$–$C_{20}$ α-olefin.

4. The film of claim 1 wherein the homogeneously branched linear ethylene/α-olefin interpolymer is a copolymer of ethylene and a $C_3$–$C_{20}$ α-olefin.

5. The film of claim 4 wherein the homogeneously branched linear ethylene/α-olefin copolymer is a copolymer of ethylene and 1-octene.

6. An ethylene polymer composition comprising (A) from about 10 percent (by weight of the total composition) to about 95 percent (by weight of the total composition) of at least one homogeneously branched linear ethylene/α-olefin interpolymer having:
   (i) a density from about 0.89 grams/cubic centimeter (g/cm$^3$) to about 0.935 g/cm$^3$,
   (ii) a molecular weight distribution ($M_w/M_n$) from about 1.8 to about 2.8,
   (iii) a melt index ($I_2$) from about 0.001 grams/10 minutes (g/10 min) to about 10 g/10 min,
   (iv) no high density fraction,
   (v) a single melting peak as measured using differential scanning calorimetry, and
   (vi) a slope of strain hardening coefficient greater than or equal to 1.3; and
(B) from about 5 percent (by weight of the total composition) to about 90 percent (by weight of the total composition) of at least one heterogeneously branched linear ethylene polymer having a density from about 0.93 g/cm$^3$ to about 0.965 g/cm$^3$.

7. The composition of claim 6 wherein the homogeneously branched linear ethylene/α-olefin interpolymer has a slope of strain hardening coefficient greater than or equal to 1.5.

8. The composition of claim 6 wherein the homogeneously branched linear ethylene/α-olefin interpolymer is an interpolymer of ethylene with at least one $C_3$–$C_{20}$ α-olefin.

9. The composition of claim 6 wherein the homogeneously branched linear ethylene/α-olefin interpolymer is a copolymer of ethylene and a $C_3$–$C_{20}$ α-olefin.

10. The composition of claim 9 wherein the homogeneously branched linear ethylene/α-olefin interpolymer is a copolymer of ethylene and 1-octene.

11. The composition of claim 6 wherein the heterogeneously branched ethylene polymer is a copolymer of ethylene and a $C_3$–$C_{20}$ α-olefin.

12. The composition of claim 11 wherein the heterogeneously branched ethylene polymer is a copolymer of ethylene and 1-octene.

13. The film of claim 9 or the composition of claim 6, wherein the density of the at least one homogeneously branched linear ethylene/α-olefin interpolymer is in the range from about 0.905 g/cm$^3$ to about 0.925 g/cm$^3$ and the $I_2$ melt index is in the range of from about 0.001 g/10 minutes to less than about 1 g/10 minutes.

14. The film of claim 1 wherein the heterogeneously branched linear ethylene polymer is an interpolymer of ethylene with at least one $C_3$–$C_{20}$ α-olefin.

15. The film of claim 14 wherein the heterogeneously branched linear ethylene polymer is a copolymer of ethylene and a $C_3$–$C_{20}$ α-olefin.

16. The film of claim 15 wherein the heterogeneously branched linear ethylene polymer is a copolymer of ethylene and 1-octene.

* * * * *

(12) EX PARTE REEXAMINATION CERTIFICATE (10259th)
United States Patent
Chum et al.

(10) Number: US 5,847,053 C1
(45) Certificate Issued: Aug. 18, 2014

(54) ETHYLENE POLYMER FILM MADE FROM ETHYLENE POLYMER BLENDS

(75) Inventors: Pak-Wing Steve Chum, Lake Jackson, TX (US); Ronald P. Markovich, Houston, TX (US); George W. Knight, Lake Jackson, TX (US); Shih-Yaw Lai, Sugar Land, TX (US)

(73) Assignee: The Dow Chemical Company, Midland, MI (US)

Reexamination Request:
No. 90/012,741, Dec. 17, 2012

Reexamination Certificate for:
Patent No.: 5,847,053
Issued: Dec. 8, 1998
Appl. No.: 08/834,050
Filed: Apr. 11, 1997

Related U.S. Application Data

(63) Continuation of application No. 08/544,497, filed on Oct. 18, 1995, now Pat. No. 5,677,383, which is a continuation of application No. 08/378,998, filed on Jan. 27, 1995, now abandoned, which is a continuation of application No. 08/054,379, filed on Apr. 28, 1993, now abandoned, which is a continuation-in-part of application No. 08/776,130, filed on Oct. 15, 1991, now Pat. No. 5,272,236.

(51) Int. Cl.
*C08L 23/00* (2006.01)
*C08J 5/18* (2006.01)
*C08L 23/08* (2006.01)
*C08F 4/00* (2006.01)
*C08F 110/00* (2006.01)
*C08F 4/659* (2006.01)
*C08F 110/02* (2006.01)
*C08F 210/00* (2006.01)
*C08F 210/16* (2006.01)
*B29C 47/00* (2006.01)

(52) U.S. Cl.
CPC ......... *B29C 47/0021* (2013.01); *B29C 47/0026* (2013.01)
USPC ....................................................... 525/240

(58) Field of Classification Search
None
See application file for complete search history.

(56) References Cited

To view the complete listing of prior art documents cited during the proceeding for Reexamination Control Number 90/012,741, please refer to the USPTO's public Patent Application Information Retrieval (PAIR) system under the Display References tab.

*Primary Examiner* — Timothy Speer

(57) ABSTRACT

Fabricated articles made from formulated ethylene polymer compositions are disclosed. Films made from such formulated compositions have surprisingly good impact and tensile properties, and an especially good combination of modulus and toughness. The ethylene polymer compositions have at least one homogeneously branched substantially linear ethylene/α-olefin interpolymer and at least one heterogeneously branched ethylene polymer. The homogeneously branched substantially linear ethylene/α-olefin interpolymer has a density from about 0.89 to about 0.92 g/cm$^3$ and a slope of strain hardening coefficient greater than or equal to about 1.3.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-16 is confirmed.

\* \* \* \* \*